(12) United States Patent
Wood

(10) Patent No.: US 7,967,251 B2
(45) Date of Patent: Jun. 28, 2011

(54) TRUSS NETWORK FOR AIRCRAFT FLOOR ATTACHMENT

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 672 days.

(21) Appl. No.: 12/050,418

(22) Filed: Mar. 18, 2008

(65) Prior Publication Data

US 2009/0236472 A1    Sep. 24, 2009

(51) Int. Cl.
    *B64C 1/00*    (2006.01)
(52) U.S. Cl. ............... 244/120; 244/131; 244/118.2
(58) Field of Classification Search .............. 244/120, 244/131, 118.2, 119, 118.1, 117 R
    See application file for complete search history.

(56) References Cited

U.S. PATENT DOCUMENTS

| 1,614,625 | A | * | 1/1927 | Muller-Cunradi | 423/417 |
| 3,141,869 | A | * | 7/1964 | Dennstedt | 526/215 |
| 4,033,247 | A | | 7/1977 | Murphy | |
| 4,479,621 | A | * | 10/1984 | Bergholz | 244/117 R |
| 6,264,141 | B1 | | 7/2001 | Shim et al. | |
| 7,338,013 | B2 | * | 3/2008 | Vetillard et al. | 244/117 R |
| 2007/0176048 | A1 | * | 8/2007 | Huber et al. | 244/119 |
| 2008/0217478 | A1 | * | 9/2008 | Keeler et al. | 244/119 |
| 2010/0001134 | A1 | * | 1/2010 | Braeutigam et al. | 244/119 |

* cited by examiner

*Primary Examiner* — Christopher P Ellis
(74) *Attorney, Agent, or Firm* — Tung & Associates

(57) ABSTRACT

A truss network for aircraft floor attachment includes an aircraft fuselage, an aircraft floor disposed in the aircraft fuselage and a three-dimensional truss network comprising at least two truss assemblies each comprising a plurality of tie rod assemblies connecting the aircraft fuselage to the aircraft floor. A method of attaching a floor structure to a honeycomb fuselage structure and an aircraft having a truss network connecting an aircraft fuselage to an aircraft floor are also disclosed.

21 Claims, 6 Drawing Sheets

TRUSS NETWORK FOR AIRCRAFT FLOOR ATTACHMENT

TECHNICAL FIELD

The disclosure relates to attachment of an aircraft floor to an aircraft fuselage. More particularly, the disclosure relates to a truss network which is suitable for attaching a honeycomb composite floor panel to a honeycomb composite fuselage panel in an aircraft.

BACKGROUND

Attachment of a floor structure to an aircraft fuselage requires distribution of the loads from the floor into the fuselage structure, must provide adequate equalization venting between the passenger compartment and the cargo bay in the event of rapid decompression in either of the compartments, and must maintain structural integrity at this interface in the event of shear loading induced by rapid or instant deceleration. Typical metallic aircraft utilize rigid floor beams attached directly to fuselage hoop frames to carry vertical floor loads and rely on a horizontally planar shear truss attached between the floor and the side walls of the fuselage to contain shear loads during rapid deceleration. This truss also may contain cutout apertures for the equalization venting.

Composite honeycomb floors are self-stiffened structures that may not require floor beams when sufficiently thickened and therefore, may not be directly coupled to the fuselage walls. Instead, upper support stanchions may be provided to support the floor. While they may provide vertical support for the floor, the stanchions may have the potential to induce a cantilevered load condition between the floor and the fuselage sidewall since the floor may not extend completely to the fuselage sidewall. With emerging composite technologies using honeycomb structures for airframes and passenger floors, there demands new innovative methods to accommodate the design requirements imposed on the floor to fuselage structural interface since honeycomb fuselage barrels do not have hoop frames and the composite floors may not have support beams underneath that connect to the fuselage sidewall.

SUMMARY

The disclosure is generally directed to a truss network for aircraft floor attachment. An illustrative embodiment of the truss network includes an aircraft fuselage, an aircraft floor disposed in the aircraft fuselage and a three-dimensional truss network comprising at least two truss assemblies each comprising a plurality of tie rod assemblies connecting the aircraft fuselage to the aircraft floor.

The disclosure is further generally directed to a method of attaching a floor structure to a honeycomb fuselage structure. An illustrative embodiment of the method includes providing an aircraft fuselage having a fuselage barrel; providing an aircraft floor in the fuselage barrel; attaching subsystem attachment fittings to the fuselage barrel; attaching floor attachment fittings to the aircraft floor; and attaching extendable and retractable tie rod assemblies between the subsystem attachment fittings and the floor attachment fittings, respectively.

The disclosure is further generally directed to an aircraft. An illustrative embodiment of the aircraft includes an aircraft fuselage, an aircraft floor disposed in the aircraft fuselage and a truss network comprising a three-dimensional truss network including at least two truss assemblies each comprising a plurality of tie rod assemblies connecting the aircraft fuselage to the aircraft floor.

BRIEF DESCRIPTION OF THE ILLUSTRATIONS

DETAILED DESCRIPTION

Figure 1:
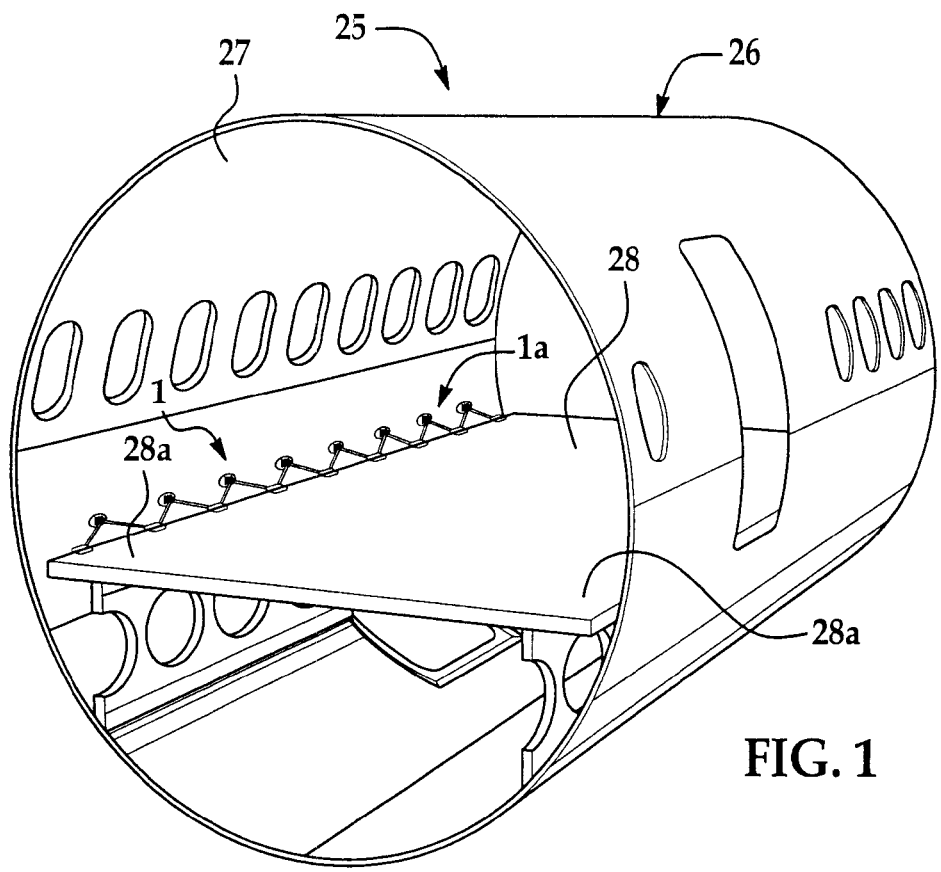
FIG. 1 is a perspective view of an interior of an aircraft fuselage, partially in section, with an illustrative embodiment of the truss network supporting an aircraft floor in the fuselage.

Referring to the drawings, an illustrative embodiment of a three-dimensional truss network for aircraft floor attachment, hereinafter truss network, is generally indicated by reference numeral 1. As shown in FIG. 1 and will be hereinafter described, in one suitable application, truss network 1 is adapted to attach an aircraft floor 28 to a fuselage barrel 27 of an aircraft fuselage 26 of an aircraft 25. The truss network 1 may be particularly adaptable to attachment of an aircraft floor 28 to a fuselage barrel 21 which may be constructed of honeycomb-sandwiched composite skin panels (not shown). The aircraft floor 28 may be constructed of one or multiple honeycomb composite floor panels. However, it will be appreciated by those skilled in the art that the truss network 1 may be applicable to attachment of an aircraft floor 28 to a fuselage barrel 27 having any of a variety of constructions.

Figure 2:
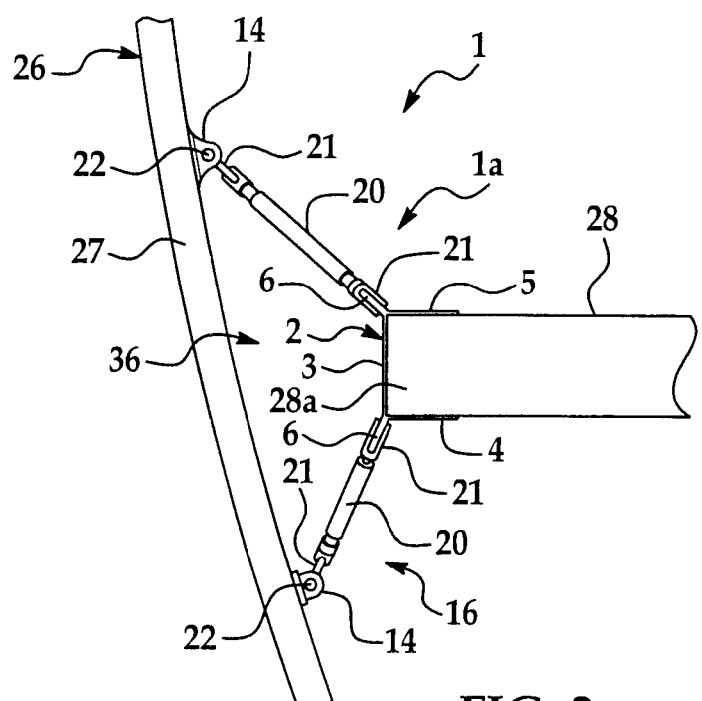
FIG. 2 is a side view, partially in section, of an illustrative embodiment of the truss network attaching an aircraft floor to an aircraft fuselage.
Figure 3:
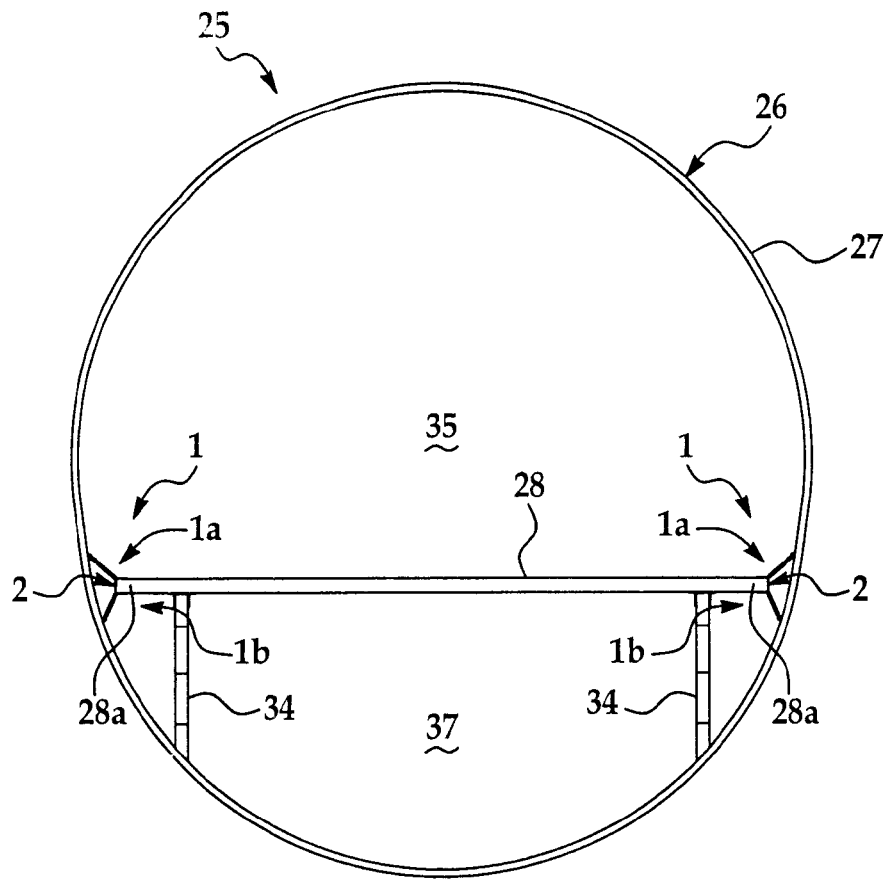
FIG. 3 is a cross-sectional view of an aircraft fuselage, with a pair of truss networks attaching an aircraft floor to the fuselage.
Figure 7:
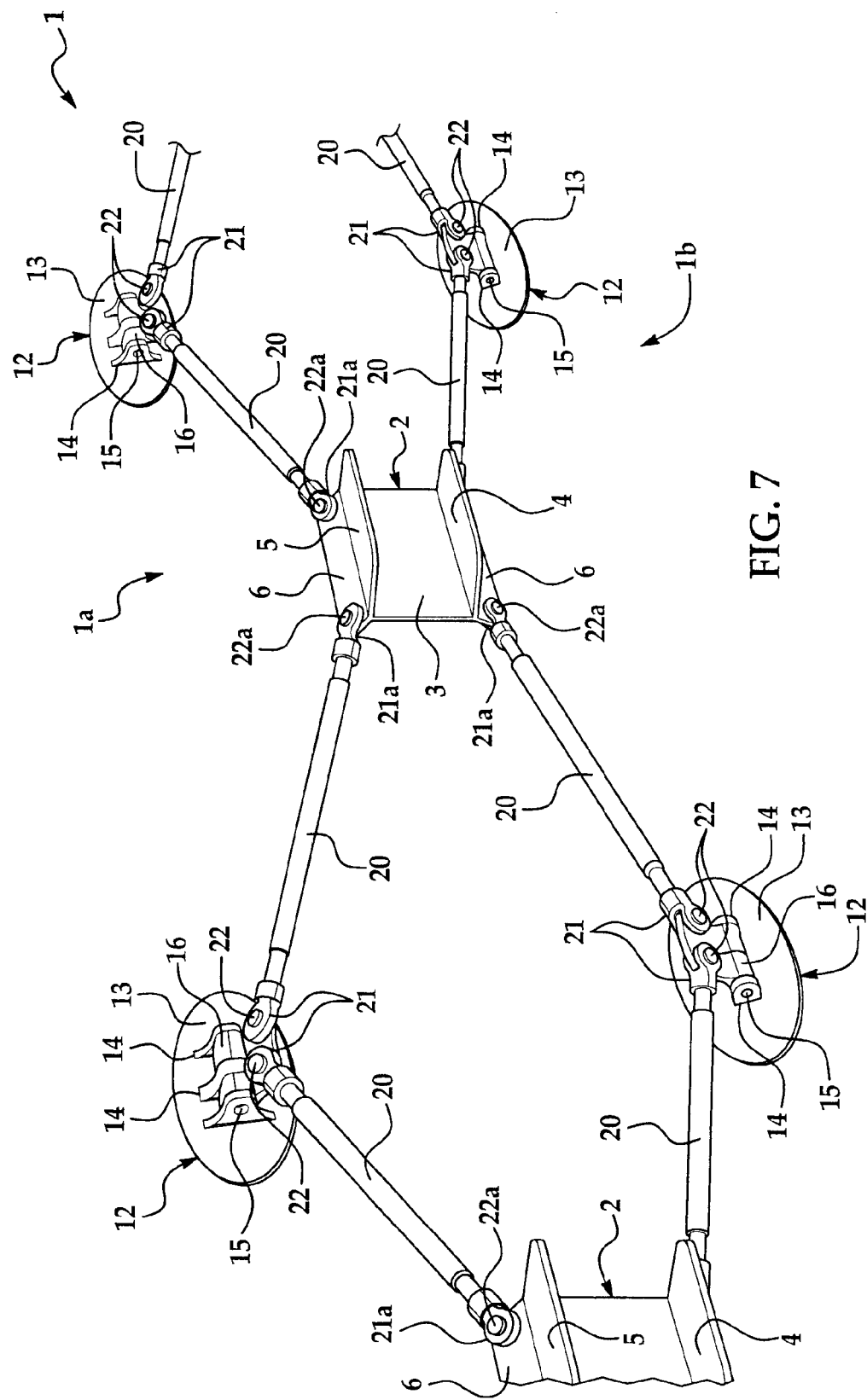
FIG. 7 is a perspective view, partially in section, of an illustrative embodiment of the truss network.

As shown in FIG. 3, each of a pair of truss networks 1 may be adapted to support a corresponding longitudinal edge portion 28a of the aircraft floor 28 in the fuselage barrel 27. Each truss network 1 may extend along the axial length of the aircraft fuselage 26 on both sides of the aircraft floor 28. As shown in FIGS. 2-4 and 7, each truss network 1 may include an upper truss assembly 1a and a lower truss assembly 1b which may be disposed above and below, respectively, each corresponding longitudinal edge portion 28a of the aircraft floor 28 in the fuselage barrel 27. As shown in FIG. 7, each truss network 1 may include multiple floor attachment fittings 2 which are attached to the interior surface of the fuselage barrel 27 in spaced-apart relationship with respect to each other using fasteners, adhesive and/or alternative attachment techniques known to those skilled in the art. Each of the upper truss assembly 1a and the lower truss assembly 1b may include multiple subsystem attachment fittings 12 which are attached to the interior surface of the fuselage barrel 27 in spaced-apart and staggered relationship with respect to the floor attachment fittings 2.

A tie rod assembly 20, which may be extendable and retractable, may connect each floor attachment fitting 2 to an adjacent and staggered subsystem attachment fitting 12. The ends of the tie rod assembly 20 may be connected to the floor attachment fitting 2 and the subsystem attachment fitting 12, respectively, in a manner which will be hereinafter described. The tie rod assemblies 20 of the upper truss assembly 1a and the tie rod assemblies 20 of the lower truss assembly 1b may be disposed at an obtuse angle with respect to each other. As shown in FIG. 7, each pair of tie rod assemblies 20 and the common floor attachment fitting 2 to which the tie rod assemblies 20 are attached may define a generally Y-shaped configuration when the truss assembly 1 is viewed from the vertical orientation or axial direction of the aircraft fuselage 26. Each pair of tie rod assemblies 20 and common floor attachment fitting 2 may also define a generally Y-shaped configuration when the truss assembly 1 is viewed from the horizontal orientation or downward direction of the aircraft fuselage 26.

Figure 6:
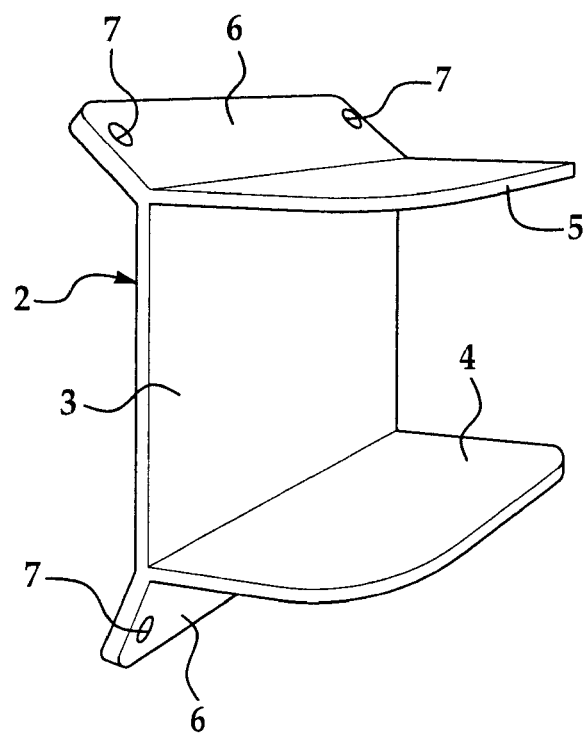
FIG. 6 is a perspective view of an exemplary floor attachment fitting of an illustrative embodiment of the truss network.

As shown in FIG. 6, each floor attachment fitting 2 may include a generally flat or planar main plate 3. A lower flange 4 and an upper flange 5 may extend from respective lower and upper edges, respectively, of the main plate 3. The lower flange 4 and the upper flange 5 correspond to the lower and upper surfaces, respectively, of the aircraft floor 28, as will be hereinafter described, and may each be disposed in generally perpendicular relationship with respect to the plane of the main plate 3. A tie rod attachment flange 6 may extend from the junction between the main plate 3 and each corresponding lower flange 4 and upper flange 5. Each tie rod attachment flange 6 may be disposed at a generally obtuse angle with respect to the plane of the main plate 3. The angle of each tie rod attachment flange 6 with respect to the plane of the main plate 3 may be determined by the angle which is required to connect each tie rod assembly 20 in a straight line to each corresponding subsystem attachment fitting 12 to which the tie rod assembly 20 is attached. A pair of spaced-apart tie rod clevis mount openings 7 may be provided in each tie rod attachment flange 6 for purposes which will be hereinafter described.

As shown in FIG. 7, each subsystem attachment fitting 12 may include an attachment fitting plate 13 which may have a generally elongated, elliptical shape. The attachment fitting plate 13 of each subsystem attachment fitting 12 may be fastened to the interior surface of the fuselage barrel 27 using fasteners (not shown), adhesive (not shown) and/or any suitable alternative fastening technique which is known to those skilled in the art.

Each tie rod assembly 20 may be attached to the attachment fitting plate 13 of each subsystem attachment fitting 12 and to each floor attachment fitting 2 using any suitable technique which is known to those skilled in the art. As further shown in FIG. 7, in some embodiments, multiple clevis bearings 14 may extend from the attachment fitting plate 13. A clevis bracket 16 may be pivotally attached to the clevis bearings 14 such as via a clevis pin 15. A tie rod clevis 21 may be provided on a corresponding end of the tie rod assembly 20 and may be pivotally attached to the clevis bracket 16 such as via a tie rod clevis pin 22, for example. In like manner, a tie rod clevis 21a may be provided on the opposite end of each tie rod assembly 20. The tie rod clevis 21a may be pivotally attached to a tie rod clevis mount opening 7 (FIG. 6) in a tie rod attachment flange 6 of a floor attachment fitting 2 via a tie rod clevis pin 22a. Each tie rod assembly 20 may be extendable to facilitate alignment of the pin opening (not shown) in each tie rod clevis 21 with a registering pin opening (not shown) in the clevis bracket 16 and alignment of the pin opening (not shown) in each tie rod clevis 21a with the corresponding tie rod clevis mount opening 7 (FIG. 6) provided in the tie rod attachment flange 6 of the floor attachment fitting 2.

Figure 4:
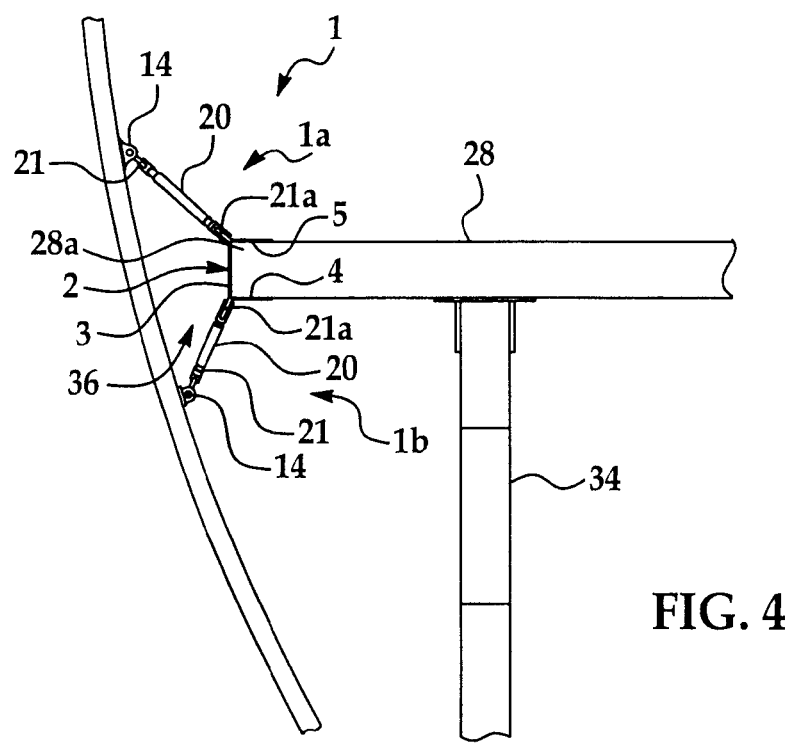
FIG. 4 is a side view, partially in section, of an illustrative embodiment of the truss network attaching an aircraft floor to an aircraft fuselage, with a floor support stanchion further supporting the aircraft floor.
Figure 5:
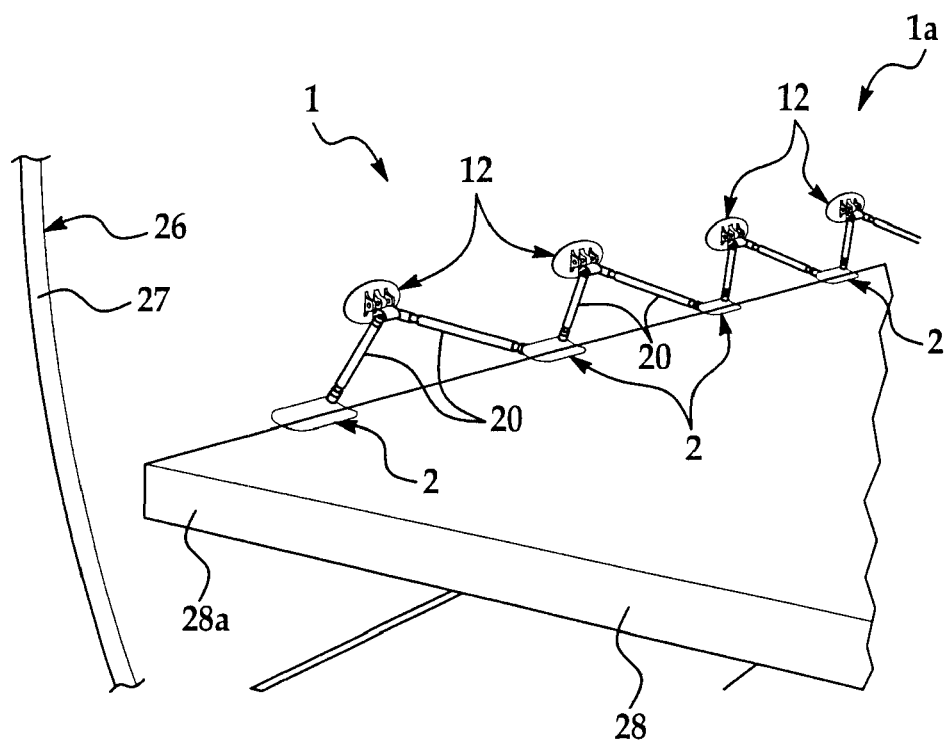
FIG. 5 is a perspective view, partially in section, of an illustrative embodiment of the truss network attaching an aircraft floor to an aircraft fuselage.

As shown in FIGS. 2-4, each longitudinal edge portion 28a of the aircraft floor 28 may be inserted between the lower flange 4 and the upper flange 5 of each floor attachment fitting 2 of each corresponding truss network 1. Each longitudinal edge portion 28a of the aircraft floor 28 may be bonded and/or otherwise attached to the floor attachment fitting 2 using adhesives, fasteners and/or other attachment technique. Floor support stanchions 34 may extend between the fuselage barrel 27 and the aircraft floor 28 to impart additional support to the aircraft floor 28. As shown in FIG. 4, a floor gap 36 may be defined between the aircraft floor 28 and the interior surface of the fuselage barrel 27 to accommodate equalization venting between the cabin (typically the area above the aircraft floor 28) and the cargo bay (typically the area below the aircraft floor 28) in the aircraft fuselage 26.

During operation of the aircraft of which the aircraft fuselage 26 is a part, the tie rod assemblies 20 of the upper truss assembly 1a and the tie rod assemblies 20 of the lower truss assembly 1b serve to react against upward and downward forces induced by the floor support stanchion 34 when positive or negative gravity forces are applied to the aircraft floor 28. When the aircraft floor 28 is subjected to downward or positive G-forces, the longitudinal edge portions 28a of the aircraft floor 28 are pivoted over the floor support stanchions 34 in the upper direction; therefore, the tie rod assemblies 20 of the upper truss assembly 1a act in compression whereas the tie rod assemblies 20 of the lower truss assembly 1b act in tension to counteract the load. The opposite effect occurs in the event that the aircraft floor 28 is subjected to an upward or negative G-force. Furthermore, the tie rod assemblies 20 may act in concert to distribute fore/aft shear loads from the aircraft floor 28 into the fuselage barrel 27 in the event of rapid deceleration. During deceleration, the tie rod assemblies 20 at the forward connecting point of the floor attachment fittings 2 are put into compression whereas the tie rod assemblies 20 at the aft connecting point of the floor attachment assemblies 20 are put into tension. Because the truss assembly 1 may be applied to both longitudinal edge portions 28a of the aircraft floor 28, the shear forces may be balanced and negated between the opposing truss assemblies 1 on each side of the aircraft fuselage 26. The minimal cross section of the truss network 1 on each side of the aircraft floor 28 may provide for unimpeded air flow between the passenger cabin (not shown) and the cargo bay (not shown) of the aircraft such that minimal pressure is exerted against the aircraft floor 28 in the event of sudden pressure change between the compartments.

Figure 8:
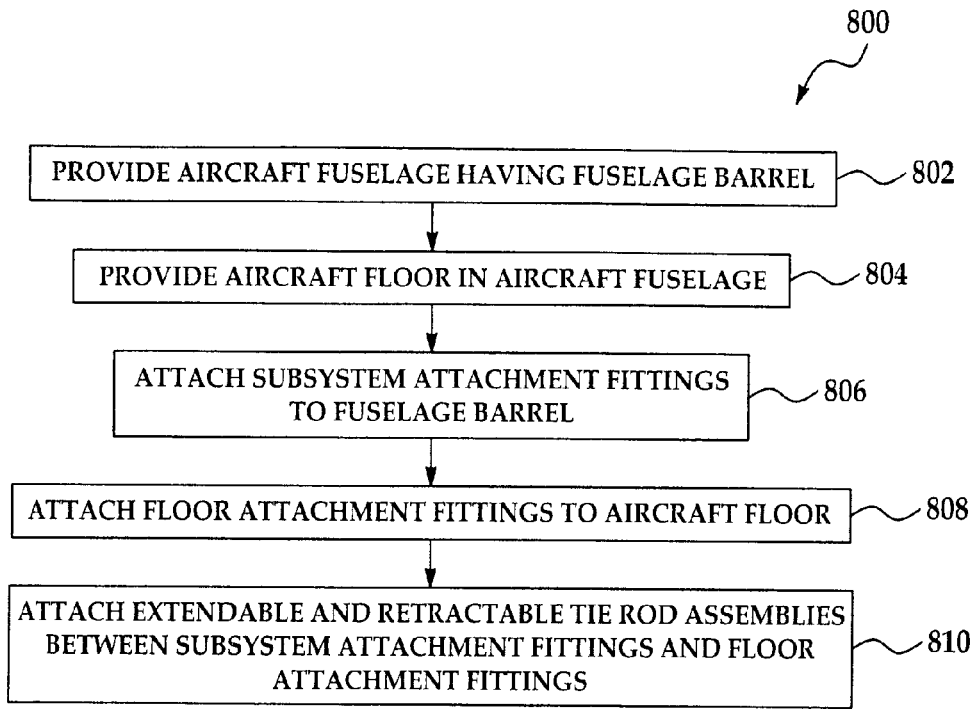
FIG. 8 is a flow diagram which illustrates an illustrative method of attaching a floor structure to a honeycomb fuselage structure.

Referring next to FIG. 8, a flow diagram 800 which illustrates an illustrative method of attaching a floor structure to a honeycomb fuselage structure is shown. In block 802, an aircraft fuselage having a fuselage barrel is provided. The fuselage barrel may be constructed of honeycomb composite panels. In block 804, an aircraft floor is provided in the aircraft fuselage. The aircraft floor may be constructed of honeycomb composite panels. In block 806, subsystem attachment fittings are attached to the fuselage barrel. In block 808, floor attachment fittings are attached to the aircraft floor. In block 810, extendable and retractable tie rod assemblies are attached between the subsystem attachment fittings and the floor attachment fittings.

Figure 9:
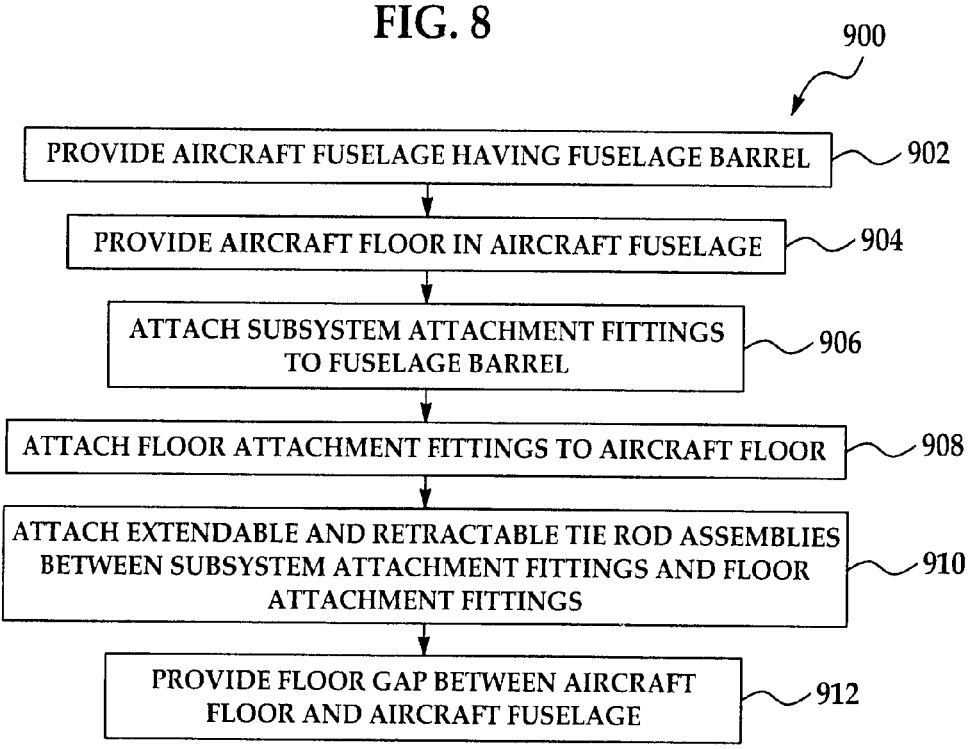
FIG. 9 is a flow diagram which illustrates a method of providing an unimpeded decompression path between an aircraft cabin and a cargo compartment of an aircraft.

Referring next to FIG. 9, a flow diagram 900 which illustrates a method of providing an unimpeded decompression path between an aircraft cabin and a cargo compartment of an aircraft is shown. In block 902, an aircraft fuselage having a fuselage barrel is provided. The fuselage barrel may be constructed of honeycomb composite panels. In block 904, an aircraft floor is provided in the aircraft fuselage. The aircraft floor may be constructed of honeycomb composite panels. In block 906, subsystem attachment fittings are attached to the fuselage barrel. In block 908, floor attachment fittings are attached to the aircraft floor. In block 910, extendable and retractable tie rod assemblies are attached between the subsystem attachment fittings and the floor attachment fittings. In block 912, a floor gap is provided between the aircraft floor and the aircraft fuselage.

Figure 10:
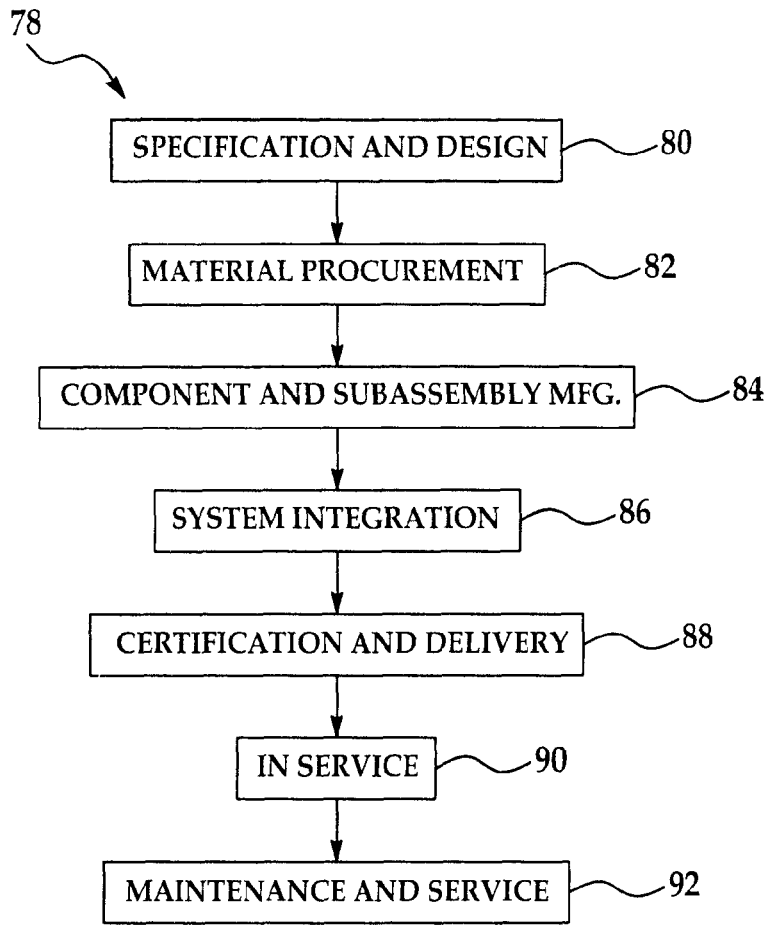
FIG. 10 is a flow diagram of an aircraft production and service methodology.
Figure 11:
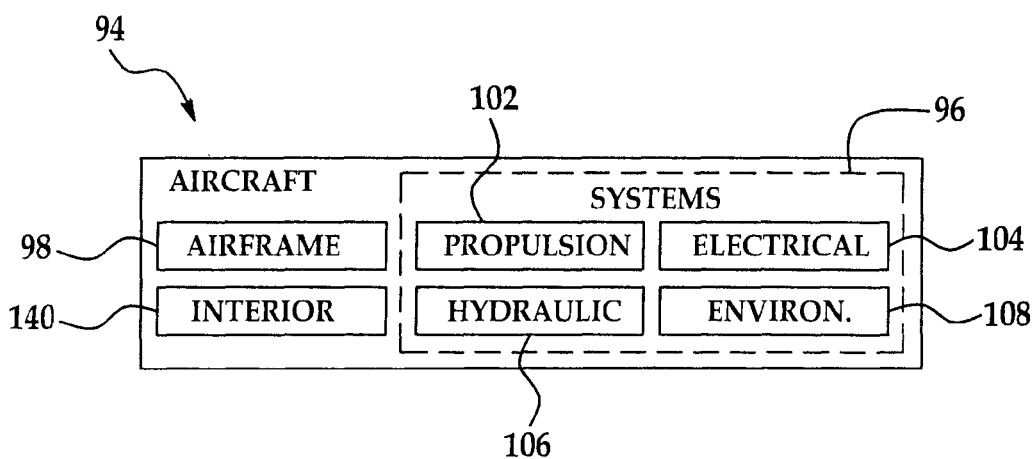
FIG. 11 is a block diagram of an aircraft.

Referring next to FIGS. 10 and 11, embodiments of the disclosure may be used in the context of an aircraft manufacturing and service method 78 as shown in FIG. 10 and an aircraft 94 as shown in FIG. 11. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A truss network for aircraft floor attachment, comprising:
   an aircraft fuselage;
   an aircraft floor disposed in said aircraft fuselage; and
   a three-dimensional truss network comprising at least two truss assemblies each comprising a plurality of tie rod assemblies connecting said aircraft fuselage to said aircraft floor, each of said plurality of tie rod assemblies is pivotable in at least two dimensions with respect to said aircraft fuselage.

2. The truss network of claim 1 wherein said at least two truss assemblies comprises a first pair of truss assemblies attaching said aircraft fuselage to a first longitudinal edge portion of said aircraft floor and a second pair of truss assemblies attaching said aircraft fuselage to a second longitudinal edge portion of said aircraft floor.

3. The truss network of claim 1 wherein each of said truss assemblies comprises a plurality of subsystem attachment fittings carried by said aircraft fuselage and a plurality of floor attachment fittings carried by said aircraft floor, and wherein said plurality of tie rod assemblies connects said plurality of subsystem attachment fittings to said plurality of floor attachment fittings, respectively.

4. The truss network of claim 1 wherein each of said plurality of tie rod assemblies is extendable and retractable.

5. The truss network of claim 3 wherein each of said plurality of subsystem attachment fittings comprises an attachment fitting plate carried by said aircraft fuselage and wherein a corresponding one of said plurality of tie rod assemblies is pivotally attached to said attachment fitting plate.

6. The truss network of claim 5 further comprising a clevis bracket pivotally carried by said attachment fitting plate and wherein said corresponding one of said plurality of tie rod assemblies is attached to said clevis bracket.

7. The truss network of claim 6 further comprising a plurality of clevis bearings carried by said attachment fitting plate and wherein said clevis bracket is pivotally carried by said plurality of clevis bearings.

8. The truss network of claim 3 wherein each of said plurality of floor attachment fittings comprises a main plate, a pair of spaced-apart flanges extending from said main plate and receiving said aircraft floor and a pair of tie rod attachment flanges extending from said main plate and each attached to a pair of said plurality of tie rod assemblies.

9. A method of attaching a floor structure to a honeycomb fuselage structure, comprising:
   providing an aircraft fuselage having a fuselage barrel;
   providing an aircraft floor in said fuselage barrel;
   attaching subsystem attachment fittings to said fuselage barrel;
   attaching floor attachment fittings to said aircraft floor; and
   attaching and pivotally adjusting in at least two dimensions said extendable and retractable tie rod assemblies between said subsystem attachment fittings and said floor attachment fittings, respectively.

10. The method of claim 9 wherein said attaching extendable and retractable tie rod assemblies between said subsystem attachment fittings and said floor attachment fittings, respectively, comprises pivotally attaching said toe rod assemblies to said subsystem attachment fittings, respectively.

11. The method of claim 9 wherein said attaching extendable and retractable tie rod assemblies between said subsystem attachment fittings and said floor attachment fittings, respectively, comprises pivotally attaching said toe rod assemblies to said floor attachment fittings, respectively.

12. The method of claim 9 wherein each of said floor attachment fittings comprises a main plate, a pair of spaced-apart flanges extending from said main plate and receiving said aircraft floor and a pair of tie rod attachment flanges extending from said main plate and each attached to a pair of said plurality of tie rod assemblies and wherein said attaching floor attachment fittings to said aircraft floor comprises inserting said aircraft floor between said pair of spaced-apart flanges.

13. The method of claim 9 wherein each of said floor attachment fittings comprises a main plate, a pair of spaced-apart flanges extending from said main plate and a pair of tie rod attachment flanges extending from said main plate and wherein said attaching extendable and retractable tie rod assemblies between said subsystem attachment fittings and said floor attachment fittings, respectively, comprises attaching each of said tie rod assemblies to a corresponding one of said floor attachment fittings at one of said pair of tie rod attachment flanges.

14. The method of claim 9 wherein said attaching extendable and retractable tie rod assemblies between said subsystem attachment fittings and said floor attachment fittings, respectively, comprises orienting said extendable and retractable tie rod assemblies at an obtuse angle with respect to each other.

15. An aircraft, comprising:
an aircraft fuselage;
an aircraft floor disposed in said aircraft fuselage; and
a truss network comprising a three-dimensional truss network including at least two truss assemblies each comprising a plurality of tie rod assemblies pivotally connecting said aircraft fuselage to said aircraft floor in at least two dimensions.

16. The aircraft of claim 15 wherein said at least two truss assemblies comprises a first pair of truss assemblies attaching said aircraft fuselage to a first longitudinal edge portion of said aircraft floor and a second pair of truss assemblies attaching said aircraft fuselage to a second longitudinal edge portion of said aircraft floor.

17. The aircraft of claim 15 wherein each of said truss assemblies comprises a plurality of subsystem attachment fittings carried by said aircraft fuselage and a plurality of floor attachment fittings carried by said aircraft floor, and wherein said plurality of tie rod assemblies connects said plurality of subsystem attachment fittings to said plurality of floor attachment fittings, respectively.

18. The aircraft of claim 17 wherein each of said plurality of tie rod assemblies is extendable and retractable.

19. The aircraft of claim 17 wherein each of said plurality of subsystem attachment assemblies comprises an attachment fitting plate carried by said aircraft fuselage and wherein a corresponding one of said plurality of tie rod assemblies is pivotally attached to said attachment fitting plate.

20. The aircraft of claim 19 further comprising a clevis bracket pivotally carried by said attachment fitting plate and wherein said corresponding one of said plurality of tie rod assemblies is attached to said clevis bracket.

21. A truss network for aircraft floor attachment, comprising:
an aircraft fuselage;
an aircraft floor disposed in said aircraft fuselage; and
a three-dimensional truss network comprising at least two truss assemblies each comprising a plurality of tie rod assemblies connecting said aircraft fuselage to said aircraft floor,
each of said truss assemblies comprises a plurality of subsystem attachment fittings carried by said aircraft fuselage and a plurality of floor attachment fittings carried by said aircraft floor, and wherein said plurality of tie rod assemblies connects said plurality of subsystem attachment fittings to said plurality of floor attachment fittings, respectively,
each of said plurality of floor attachment fittings comprises a main plate, a pair of spaced-apart flanges extending from said main plate and receiving said aircraft floor and a pair of tie rod attachment flanges extending from said main plate and each attached to a pair of said plurality of tie rod assemblies.

* * * * *